United States Patent
Lau et al.

(10) Patent No.: US 9,358,659 B2
(45) Date of Patent: Jun. 7, 2016

(54) COMPOSITION AND METHOD FOR POLISHING GLASS

(71) Applicant: Cabot Microelectronics Corporation, Aurora, IL (US)

(72) Inventors: Hon Wu Lau, Singapore (SG); Haresh Siriwardane, Dayton, OH (US)

(73) Assignee: Cabot Microelectronics Corporation, Aurora, IL (US)

( * ) Notice: Subject to any disclaimer, the term of this patent is extended or adjusted under 35 U.S.C. 154(b) by 456 days.

(21) Appl. No.: 13/784,330

(22) Filed: Mar. 4, 2013

(65) Prior Publication Data

US 2014/0248823 A1    Sep. 4, 2014

(51) Int. Cl.
  *C09G 1/02* (2006.01)
  *B24B 37/04* (2012.01)
  *C08K 3/36* (2006.01)

(52) U.S. Cl.
  CPC ............. *B24B 37/044* (2013.01); *C09G 1/02* (2013.01); *C08K 3/36* (2013.01)

(58) Field of Classification Search
  CPC ......................................................... C09G 1/02
  USPC ............................................ 51/307; 252/79.1
  See application file for complete search history.

(56) References Cited

U.S. PATENT DOCUMENTS

| | | | |
|---|---|---|---|
| 4,752,628 A | 6/1988 | Payne | |
| 5,196,353 A | 3/1993 | Sandhu et al. | |
| 5,433,651 A | 7/1995 | Lustig et al. | |
| 5,609,511 A | 3/1997 | Moriyama et al. | |
| 5,643,046 A | 7/1997 | Katakabe et al. | |
| 5,658,183 A | 8/1997 | Sandhu et al. | |
| 5,730,642 A | 3/1998 | Sandhu et al. | |
| 5,838,447 A | 11/1998 | Hiyama et al. | |
| 5,872,633 A | 2/1999 | Holzapfel et al. | |
| 5,876,490 A | 3/1999 | Ronay | |
| 5,893,796 A | 4/1999 | Birang et al. | |
| 5,949,927 A | 9/1999 | Tang | |
| 5,964,643 A | 10/1999 | Birang et al. | |
| 6,099,604 A | 8/2000 | Sandhu et al. | |
| 6,221,119 B1 | 4/2001 | Homola | |
| 6,258,140 B1 | 7/2001 | Shemo et al. | |
| 6,303,049 B1 | 10/2001 | Lee et al. | |
| 6,776,810 B1 | 8/2004 | Cherian et al. | |
| 6,821,897 B2 | 11/2004 | Schroeder et al. | |
| 7,267,702 B2 | 9/2007 | Honma et al. | |
| 7,300,478 B2 | 11/2007 | Ferranti et al. | |
| 7,416,680 B2 | 8/2008 | Benning et al. | |
| 7,511,008 B2 | 3/2009 | Scheuing et al. | |
| 2002/0173241 A1 | 11/2002 | Costas et al. | |
| 2004/0211337 A1 | 10/2004 | Lee et al. | |
| 2005/0208883 A1 | 9/2005 | Yoshida et al. | |
| 2006/0086056 A1 | 4/2006 | Lee | |
| 2006/0201914 A1 | 9/2006 | Uchikura et al. | |
| 2007/0145014 A1 | 6/2007 | Nishimoto et al. | |
| 2007/0167116 A1 | 7/2007 | Yoshida et al. | |
| 2007/0251270 A1 | 11/2007 | Miyatani et al. | |
| 2008/0067077 A1 | 3/2008 | Kodera et al. | |
| 2009/0181539 A1 | 7/2009 | Kon et al. | |
| 2009/0197415 A1 | 8/2009 | Fujii et al. | |
| 2009/0275188 A1 | 11/2009 | Park et al. | |
| 2010/0022171 A1 | 1/2010 | Naguib et al. | |
| 2010/0243950 A1 | 9/2010 | Harada et al. | |
| 2011/0159785 A1 | 6/2011 | Harada et al. | |
| 2011/0183581 A1 | 7/2011 | Otsu et al. | |
| 2013/0183889 A1* | 7/2013 | Yoneda | ............... C09K 3/1409  451/59 |

FOREIGN PATENT DOCUMENTS

| | | | | |
|---|---|---|---|---|
| WO | WO 01/02134 A1 | | 1/2001 | |
| WO | WO 2012/039428 | * | 3/2012 | ............... C09K 3/14 |

OTHER PUBLICATIONS

Basim et al., "Optimal Size Distribution of CMP Slurries for Enhanced Polishing with Minimal Defects," *Electrochemical Society Proceeding*, 99(37): 369-381 (2000).
Choi et al., "Effect of Slurry Ionic Salts at Dielectric Silica CMP," *Journal of the Electrochemical Society*, 151(3): G185-G189 (2004).
Choi et al., "pH and Down Load Effects on Silicon Dioxide Dielectric CMP," *Electrochemical and Solid-State Letters*, 7(7): G141-G144 (2004).
Cook, "Chemical Processes in Glass Polishing," *Journal of Non-Crystalline Solids*, 120: 152-171 (1990).
Cumbo et al., "Slurry particle size evolution during the polishing of optical glass," *Applied Optics*, 34(19): 3743-3755 (Jul. 1, 1995).
Zaman et al., "Adsorption of a Low-Molecular-Weight Polyacrylic Acid on Silica, Alumina, and Kaolin," *Journal of Colloid and Interface Science*, 256: 73-78 (2002).
Zhang et al., "Particle size and surfactant effects on chemical mechanical polishing of glass using silica-based slurry," *Applied Optics*, 49(28): 5480-5485 (Oct. 1, 2010).

* cited by examiner

*Primary Examiner* — Pegah Parvini
(74) *Attorney, Agent, or Firm* — Thomas Omholt; Arlene Homilla

(57) ABSTRACT

The invention provides a chemical-mechanical polishing composition containing (a) abrasive particles, (b) a polymer, and (c) water, wherein (i) the polymer possesses an overall charge, (ii) the abrasive particles have a zeta potential $Z_a$ measured in the absence of the polymer and the abrasive particles have a zeta potential $Z_b$ measured in the presence of the polymer, wherein the zeta potential $Z_a$ is a numerical value that is the same sign as the overall charge of the polymer, and (iii) |zeta potential $Z_b$|>|zeta potential $Z_a$|. The invention also provides a method of polishing a substrate with the polishing composition.

22 Claims, 1 Drawing Sheet

Polishing Composition 5A

Average of 2 Asperity Counts

Polishing Composition 6B

Average of 0.25 Asperity Counts

COMPOSITION AND METHOD FOR POLISHING GLASS

BACKGROUND OF THE INVENTION

The demand for increased storage capacity in memory or rigid disks and the trend towards miniaturization of memory or rigid disks (due to the requirement for smaller hard drives in computer equipment) continues to emphasize the importance of the memory or rigid disk manufacturing process, including the planarization or polishing of such disks for ensuring maximal performance. Apart from their well-known use in notebook computers, hard disk drives are also found in car navigation systems and digital video cameras. The recording media for hard disk drives used in such mobile devices has to be able to prevent data loss, which means it must have the ability to withstand vibration and shock. Glass memory disks have superior shock-resistance characteristics in comparison to the aluminum disks that are used in non-portable equipment. As a result, there is an increased interest in the use of glass as a substrate in memory disk applications.

As the demand for increased storage capacity has increased, so has the need for improved processes for the polishing of such memory or rigid disks. The term "memory or rigid disk" refers to any magnetic disk, hard disk, rigid disk, or memory disk for retaining information in electromagnetic form. The memory or rigid disk typically has a surface that comprises nickel-phosphorus, but the memory or rigid disk surface can comprise any other suitable material. The planarity of the memory or rigid disks must be improved, as the distance between the recording head of a disk drive and the surface of the memory or rigid disk has decreased with improvements in recording density that demand a lower flying height of the magnetic head with respect to the memory or rigid disk. In order to permit a lower flying height of the magnetic head, improvements to the surface finish of the memory or rigid disk are required.

Along with the need to improve planarity of memory disks is a need to decrease the surface roughness of the disks and to reduce the number of microasperities found thereon. While there exist several chemical-mechanical polishing (CMP) compositions and methods for use in conjunction with metallic memory disks, few conventional CMP methods or commercially available CMP compositions are well-suited for the planarization or polishing of glass memory or rigid disks. Attempts have been made to decrease surface roughness by reducing the particle size of abrasives used in the polishing compositions; however, removal rates and therefore throughput can be drastically reduced with use of smaller abrasive particle size.

Thus, there remains in the art a need for improved polishing methods for the polishing of glass substrates.

BRIEF SUMMARY OF THE INVENTION

The invention provides a chemical-mechanical polishing composition comprising, consisting essentially of, or consisting of (a) abrasive particles, (b) a polymer, and (c) water, wherein the following conditions are satisfied: (i) the polymer possesses an overall charge, (ii) the abrasive particles have a zeta potential $Z_a$ measured in the absence of the polymer and the abrasive particles have a zeta potential $Z_b$ measured in the presence of the polymer, wherein the zeta potential $Z_a$ is a numerical value that is the same sign as the overall charge of the polymer, and (iii) |zeta potential $Z_b$|>|zeta potential $Z_a$|.

The invention also provides a chemical-mechanical polishing composition comprising, consisting essentially of, or consisting of (a) abrasive particles comprising silica on an outer surface of the abrasive particles, (b) a polymer comprising a poly(alkyl)acrylate, a salt thereof, or a combination thereof, wherein the polymer comprises 0-3 mol % of a monomer having a sulfonate group or sulfonic acid group, and (c) water, wherein the polishing composition has a pH of about 1.8 to about 4 and the following conditions are satisfied: (i) the polymer possesses an overall negative charge, (ii) the abrasive particles have a zeta potential $Z_a$ measured in the absence of the polymer and the abrasive particles have a zeta potential $Z_b$ measured in the presence of the polymer, wherein the zeta potential $Z_a$ is negative, and (iii) |zeta potential $Z_b$|>|zeta potential $Z_a$|.

The invention further provides a method of chemical-mechanically polishing a substrate, which method comprises (1) contacting a substrate with a polishing pad and the chemical-mechanical polishing composition comprising (a) abrasive particles, (b) a polymer, and (c) water, wherein the following conditions are satisfied: (i) the polymer possesses an overall charge, (ii) the abrasive particles have a zeta potential $Z_a$ measured in the absence of the polymer and the abrasive particles have a zeta potential $Z_b$ measured in the presence of the polymer, wherein the zeta potential $Z_a$ is a numerical value that is the same sign as the overall charge of the polymer, and (iii) |zeta potential $Z_b$|>|zeta potential $Z_a$|, (2) moving the polishing pad relative to the substrate with the chemical-mechanical polishing composition therebetween, and (3) abrading at least a portion of the substrate to polish the substrate.

DETAILED DESCRIPTION OF THE INVENTION

Figure 1A:
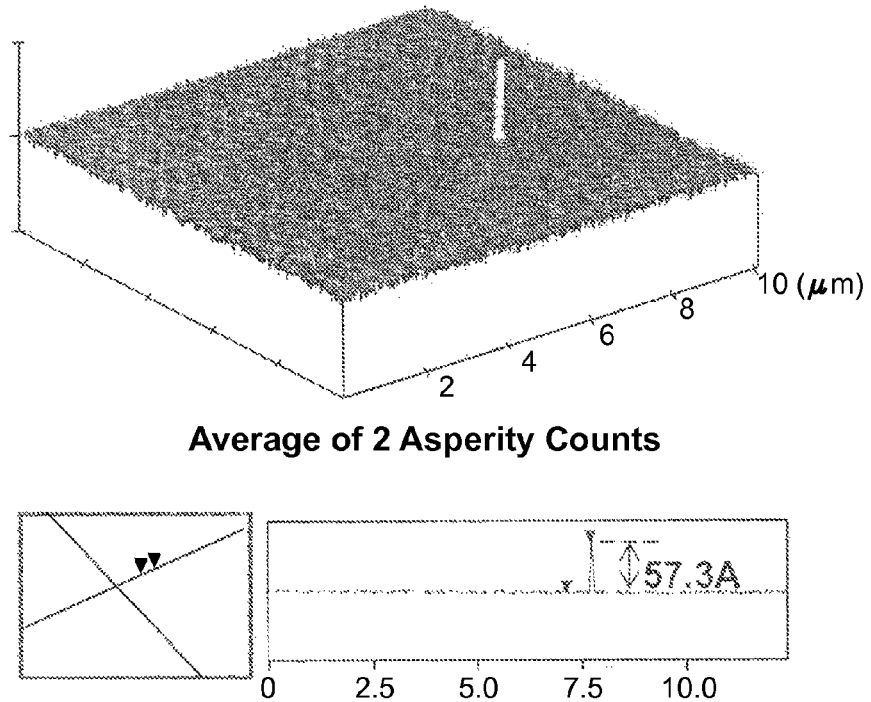
FIGS. 1A and 1B illustrate the average asperity count and magnitude of asperities achieved using chemical-mechanical polishing compositions encompassed (FIG. 1B) and not encompassed (FIG. 1A) by the invention (see Example 5).

The invention provides a chemical-mechanical polishing composition comprising, consisting essentially of, or consisting of (a) abrasive particles, (b) a polymer, and (c) water, wherein the following conditions are satisfied: (i) the polymer possesses an overall charge, (ii) the abrasive particles have a zeta potential $Z_a$ measured in the absence of the polymer and the abrasive particles have a zeta potential $Z_b$ measured in the presence of the polymer, wherein the zeta potential $Z_a$ is a numerical value that is the same sign as the overall charge of the polymer, and (iii) |zeta potential $Z_b$|>|zeta potential $Z_a$|.

The abrasive particles can comprise, consist essentially of or consist of any suitable material, which material typically is a metal oxide and/or a metalloid oxide (hereinafter collectively referred to as "metal oxides"). Examples of suitable materials include alumina, silica, titania, ceria, zirconia, germania, magnesia, tantalum oxide, and combinations thereof. In some embodiments, the abrasive particles do not comprise alumina or ceria. Preferably, an outer surface of the abrasive particles comprises or consists of silica, and more preferably the abrasive particles are silica particles (i.e., the abrasive particles consist of silica).

The abrasive particles also can comprise, consist essentially of, or consist of composite particles comprising more than one material, such as two, three, four, or five materials. The composite particles can be homogenous or a heterogeneous mixture of more than one material. In a preferred embodiment, an outer surface of the composite particle comprises or consists of silica. The composite particles can also have a core-shell structure, in which a core particle comprising one or more materials is coated with one or more shells comprising one or more materials, which materials of the core and shell(s) can be the same or different. Preferably, the outermost shell of the composite particles comprises or consists of silica.

The abrasive particles can be prepared by any suitable method, such as wet-process methods. Wet-process abrasive particles are characterized as being prepared by polymerization of soluble precursors from aqueous solutions thereof, and the wet-process methods typically include condensation polymerization methods and precipitation methods. Wet-process silica typically can be prepared by the polymerization or precipitation of soluble silica precursors from aqueous solutions thereof, and suitable examples of wet-process silica include condensation-polymerized silica that can be base-stabilized, or precipitated silica. Wet-process silica can be prepared by polymerizing or precipitating, for example, $Si(OH)_4$, an alkali metal silicate, an alkoxysilane, and combinations thereof. Suitable alkali metal silicates have the general formula $Si(OM)_4$, in which "M" is an alkali metal. Suitable alkali metal silicates include lithium, sodium, and potassium silicate. More preferably, the abrasive is silica that is obtained by precipitation of silicic acid and which is typically provided as aqueous silica sols. Suitable starting materials for the wet-process silica include alkali metal silicates (e.g., sodium silicate and potassium silicate). Preferably, the silica sols comprise anionic substantially spherical silica particles which are stabilized with sodium and/or potassium ions. Suitable silica sols are available from Nissan Chemical (e.g., SNOWTEX products), Nyacol Nanotechnologies, Inc. (e.g., NEXSIL products, such as NEXSIL and NEXSIL A series products), EKA Chemicals (e.g., BINDZIL products, such as BINDZIL 30/310, 30/360, 40/130, 40/170, 40/220, and 50/80 products), AkzoNobel (e.g., LEVASIL products), Nalco Chemical (e.g., TX13112, TX11005, DVSTS006, 1034A, 1050, 2327, and 2329 products), DuPont, Bayer, Applied Research, Silbond, and Clariant.

The silica particles can have any suitable average particle size (i.e., average particle diameter). As used herein, the term "average particle size" refers to the D50, which is the median particle size as determined using dynamic light scattering, and is referred to herein as the "D50 particle size." The silica particles can have a D50 particle size of about 10 nm or more, e.g., about 15 nm or more, about 20 nm or more, about 25 nm or more, about 28 nm or more, or about 30 nm or more. Alternatively, or in addition, the silica can have a D50 particle size of about 80 nm or less, e.g., about 75 nm or less, about 70 nm or less, about 60 nm or less, about 50 nm or less, about 45 nm or less, about 40 nm or less, about 35 nm or less, about 32 nm or less, or about 30 nm or less. Thus, the silica can have a D50 particle size bounded by any two of the above endpoints. For example, the silica can have a D50 particle size of about 10 nm to about 80 nm, about 10 nm to about 70 nm, about 10 nm to about 60 nm, about 10 nm to about 50 nm, about 10 nm to about 40 nm, about 20 nm to about 50 nm, about 20 nm to about 40 nm, about 20 nm to about 35 nm, about 25 nm to about 40 nm, about 25 nm to about 35 nm, about 25 nm to about 30 nm, about 28 nm to about 32 nm, or about 30 nm to about 35 nm.

The polishing composition can comprise any suitable amount of silica. Typically, the polishing composition can contain about 0.01 wt. % or more, e.g., about 0.05 wt. % or more, about 0.1 wt. % or more, about 0.5 wt. % or more, about 1 wt. % or more, about 2 wt. % or more, about 3 wt. % or more of silica, about 4 wt. % or more of silica, or about 5 wt. % or more of silica. Alternatively, or in addition, the polishing composition can contain about 50 wt. % or less, e.g., about 40 wt. % or less, about 30 wt. % or less, about 20 wt. % or less, about 15 wt. % or less, about 10 wt. % or less, or about 5 wt. % or less of silica. Thus, the polishing composition can comprise silica in amounts bounded by any two of the above endpoints recited for silica. For example the polishing composition can comprise about 0.01 wt. % to about 50 wt. %, about 0.5 wt. % to about 40 wt. %, about 1 wt. % to about 30 wt. %, about 1 wt. % to about 20 wt. % of silica, about 2 wt. % to about 20 wt. % of silica, about 3 wt. % to about 10 wt. % of silica, about 4 wt. % to about 10 wt. % of silica, about 5 wt. % to about 15 wt. % of silica, or about 5 wt. % to about 10 wt. % of silica.

The abrasive particles preferably are colloidally stable. The term colloid refers to the suspension of abrasive particles in the liquid carrier. Colloidal stability refers to the maintenance of that suspension through time. In the context of this invention, an abrasive is considered colloidally stable if, when the abrasive is placed into a 100 ml graduated cylinder and allowed to stand unagitated for a time of 2 hours, the difference between the concentration of particles in the bottom 50 ml of the graduated cylinder ([B] in terms of g/ml) and the concentration of particles in the top 50 ml of the graduated cylinder ([T] in terms of g/ml) divided by the initial concentration of particles in the abrasive composition ([C] in terms of g/ml) is less than or equal to 0.5 (i.e., $\{[B]-[T]\}/[C] \leq 0.5$). More preferably, the value of $[B]-[T]/[C]$ is less than or equal to 0.3, and most preferably is less than or equal to 0.1.

The chemical-mechanical polishing composition of the invention can contain any suitable liquid carrier (e.g., solvent or dispersion medium). The liquid carrier can comprise, consist essentially of, or consist of any suitable solvent or dispersion medium, including, for example, aqueous carriers (e.g., water), non-aqueous carriers (e.g., organic solvents), or mixtures thereof. In a preferred embodiment, the liquid carrier comprises about 50% or more of water in a mixture with a non-aqueous carrier. For example, the liquid carrier can comprise about 60% or more, about 70% or more, about 80% or more, or about 90% or more of water in a mixture with a non-aqueous carrier. The water may be miscible or immiscible with the non-aqueous carrier, though preferably the water is miscible with the non-aqueous carrier. The liquid carrier preferably comprises water, and more preferably the liquid carrier is water (e.g., the liquid carrier consists of water), such as de-ionized water.

The chemical-mechanical polishing composition of the invention can contain any suitable polymer. The polymer can comprise, consist essentially of, or consist of polymer(s) having an overall charge in the chemical-mechanical polishing composition, which overall charge typically is a consequence of the functional groups of the polymer, the pH of the chemical-mechanical polishing composition, and/or the presence of other components in the composition. The polymer may possess groups having a permanent charge (e.g., a quaternary alkylammonium group), and/or the polymer may possess ionizable groups (e.g., a sodium carboxylate group) that become charged when dispersed or dissolved in a liquid medium. The charge on the polymer also can depend on the pH of the medium.

Suitable polymers possessing an overall charge include cationic polymers, anionic polymers, amphoteric polymers, and combinations thereof. In a preferred embodiment, the polymer is an anionic polymer possessing an overall negative charge in the chemical-mechanical polishing composition of the invention. The polymers can be homopolymers, copolymers (e.g., block, graft, random, and/or alternating copolymers, terpolymers, and higher "x"-polymers, such as 4-, 5-, 6-, 7-, 8-, 9-, or 10-polymers), salts thereof, and combinations/blends thereof. The polymers typically are synthesized from one or more monomers by any suitable polymerization method known in the art, such as condensation polymerization or radical polymerization, or the polymers can be commercially purchased. Suitable examples of polymers that possess an overall charge include poly(alkyl)(alkyl)acrylates (e.g., polyacrylates), poly(alkyl)(alkyl)acrylic acids (e.g., polyacrylic acids), polycarboxylates, polycarboxylic acids, polyacrylamides, polyamides, polyamines, copolymers thereof, blends thereof, and salts thereof (e.g., lithium, sodium, potassium, ammonium, magnesium, calcium, zinc, iron, and copper salts thereof, etc.). Additional suitable polymers, as well as suitable monomers used to synthesize such suitable polymers, are described in U.S. Pat. No. 7,511,008, which is incorporated herein by reference in its entirety. In a preferred embodiment, the polymer is a polyacrylate, such as a sodium polyacrylate (e.g., DEQUEST P9020 available from Thermphos).

The terms "poly(alkyl)(alkyl)acrylates" and "poly(alkyl)(alkyl)acrylic acids" as used herein mean that each of the "(alkyl)" portions is optional, i.e., may or may not be present in the polymer, and the "(alkyl)" portions may be the same or different. The "poly(alkyl)(alkyl)acrylates" and "poly(alkyl)(alkyl)acrylic acids" can be homopolymers, copolymers, salts thereof, and combinations/blends thereof, as described hereinabove. The monomers or comonomers used to synthesize the "poly(alkyl)(alkyl)acrylates" and "poly(alkyl)(alkyl)acrylic acids" are (alkyl)(alkyl)acrylates and/or (alkyl)(alkyl)acrylic acids. The "(alkyl)" portions in the polymers and monomers typically comprise alkyl groups having 1 to 20 carbons. For example, suitable "poly(alkyl)(alkyl)acrylates" include poly(methacrylate) (i.e., the first "(alkyl)" is not present) and polyacrylate (in which neither the first nor second "(alkyl)" group is present). Suitable "(alkyl)" portions include methyl, ethyl, 2-ethylhexyl, propyl, butyl, pentyl, hexyl, heptyl, octyl, nonyl, decyl, etc., that can be combined in any suitable manner. Suitable "poly(alkyl)(alkyl)acrylates" include poly(ethylacrylate) and a copolymer of 2-ethylhexyl methacrylate and methacrylate. Suitable "poly(alkyl)(alkyl)acrylic acids" include poly(propylacrylic acid). Typically, any poly(alkyl)(alkyl)acrylate can be employed in the chemical-mechanical polishing composition of the invention, provided that the polymer, copolymer, and/or salt thereof has the properties described herein.

It will be appreciated that the degree of deprotonation of the polyvalent carboxylic acid-based polymer will depend on the pH of the polishing composition in which it is utilized. Thus, the polyvalent carboxylic acid-based polymer can be provided in the acid form, a partially neutralized form, or even a completely neutralized form.

In some embodiments, the polymer comprises 0-3 mol % of a monomer or comonomer having a sulfonate group or sulfonic acid group. Surprisingly, a chemical-mechanical polishing composition of the invention, in which, inter alia, the polymer comprises less than 3 mol % of a monomer or comonomer having a sulfonate group or sulfonic acid group, results in a lower surface roughness and/or a lower extreme radius curvature of a polished substrate as compared to a similar polishing composition comprising a polymer having more than 3 mol % of a monomer or comonomer having a sulfonate group or sulfonic acid group. For example, the polymer of the inventive polishing composition can comprise less than 3 mol %, e.g., less than 2.5 mol %, less than 2.0 mol %, less than 1.5 mol %, less than 1.0 mol %, less than 0.5 mol %, or less than 0.1 mol % of a monomer or comonomer having a sulfonate group or sulfonic acid group. In this regard, when the polymer comprises, for example, a poly(alkyl)(alkyl)acrylic acid, a salt thereof, or a combination thereof comprising monomers that are an (alkyl)(alkyl)acrylic acid, a salt thereof, or a combination thereof, the polymer comprises less than 3 mol % of a comonomer having a sulfonate group or sulfonic acid group. In preferred embodiments, the polymer does not comprise a monomer or comonomer having a sulfonate group or sulfonic acid group (i.e., the polymer comprises 0 mol % of a monomer or comonomer having a sulfonate group or sulfonic acid group).

The polymer can have a molecular weight of about 500 g/mol or more, e.g., about 750 g/mol or more, about 1000 g/mol or more, about 1250 g/mol or more, about 1500 g/mol or more, about 2000 g/mol or more, about 2500 g/mol or more, or about 3000 g/mol or more. Alternatively, or in addition, the silica can have a molecular weight of about 10000 g/mol or less, e.g., about 5000 g/mol or less, about 4500 g/mol or less, about 4000 g/mol or less, about 3500 g/mol or less, or about 3000 g/mol or less. Thus, the polymer can have a molecular weight bounded by any two of the above endpoints. For example, the polymer can have a molecular weight of about 500 g/mol to about 10000 g/mol, about 500 g/mol to about 5000 g/mol, about 750 g/mol to about 4500 g/mol, about 1000 g/mol to about 4000 g/mol, about 1500 g/mol to about 3500 g/mol, about 2000 g/mol to about 3000 g/mol, about 2500 g/mol to about 3000 g/mol, about 2500 g/mol to about 3500 g/mol, or about 3000 g/mol to about 3500 g/mol.

The polishing composition can comprise any suitable amount of the polymer, e.g., about 5 ppm or more, about 10 ppm or more, about 25 ppm or more, about 50 ppm or more, about 75 ppm or more, about 100 ppm or more, about 150 ppm or more, about 200 ppm or more, or about 250 ppm or more of the polymer. Alternatively, or in addition, the polishing composition can comprise about 1000 ppm or less, about 900 ppm or less, about 800 ppm or less, about 700 ppm or less, about 600 ppm or less, or about 500 ppm or less of the polymer. Thus, the polishing composition can comprise silica in amounts bounded by any two of the above endpoints recited for the polymer. For example the polishing composition can comprise about 5 ppm to about 1000 ppm, about 10 ppm to about 900 ppm, about 25 ppm to about 800 ppm, about 50 ppm to about 700 ppm, about 100 ppm to about 600 ppm, or about 200 ppm to about 500 ppm of the polymer.

Although not wishing to be bound by theory, it is believed that the polymer encapsulates the silica particles without being strongly adsorbed onto the surfaces of the particles, due to the at least partial negative charges of the particle surfaces and of the polymer. As a result, the zeta potential of the polymer encapsulated silica particles is more negative than the zeta potential of silica particles by themselves. That is, the absolute value of the zeta potential of the polymer encapsulated silica particles is greater than the absolute value of zeta potential of silica particles by themselves as expressed by the formula: |zeta potential $Z_b$|>|zeta potential $Z_a$| wherein $Z_b$ is the zeta potential of the silica particles in the presence of the polymer and $Z_a$ is the zeta potential of the silica particles in the absence of the polymer.

The abrasive particles typically have a zeta potential $Z_a$ measured in the absence of the polymer, and the abrasive particles have a zeta potential $Z_b$ measured in the presence of the polymer, wherein the zeta potential $Z_a$ is a numerical value that is the same sign as the overall charge of the polymer, and the absolute value of zeta potential $Z_b$ typically is greater than the absolute value of zeta potential $Z_a$ (i.e., |zeta potential $Z_b$|>|zeta potential $Z_a$|). The equation "|zeta potential $Z_b$|>|zeta potential $Z_a$|" reflects, inter alia, that the presence of the polymer typically increases the magnitude of the charge of the abrasive particles (i.e., the magnitude of zeta potential $Z_b$ is increased relative to the magnitude of zeta potential $Z_a$). The zeta potential of an abrasive particle refers to the difference between the electrical charge of the ions surrounding the abrasive particle and the electrical charge of the bulk solution (e.g., the liquid carrier and any other components dissolved therein). The zeta potential of the abrasive particles typically will vary with pH and/or the presence of other components (e.g., charged polymers), as described in more detail hereinbelow, and the zeta potential can be measured by any suitable method known in the art, such as electrophoretic mobility techniques. The zeta potential of an abrasive particle can be positive within one pH range and negative within another pH range, depending on the material comprising the abrasive particle. Some materials, however, may only have positive or negative zeta potentials within a given pH range. For materials that do exhibit positive and negative zeta potentials over a given pH range, the pH at which the zeta potential of an abrasive particle changes from negative to positive is termed the isoelectric point (i.e., the pH at which the abrasive particles have no net electrical charge). For example, the isoelectric point of silica abrasive particles in a dispersion of water is a pH less than about 2 (e.g., about 1.5 to about 1.7), wherein the silica abrasive particles have a zeta potential of zero.

Conventional wisdom would suggest that, due to the well-known phenomenon of the attraction of unlike charges and the repulsion of like charges, only a polymer having an opposite charge to the numerical sign of the zeta potential of the abrasive particle would associate with the abrasive particle, as described in U.S. Pat. No. 6,776,810, which is incorporated herein by reference in its entirety. However, surprisingly, even when the abrasive particles have a zeta potential having a numerical value that is the same sign as the polymer (i.e., both negative or both positive), the polymer unexpectedly encapsulates and/or associates with the abrasive particle in some manner (e.g., by way of hydrogen bonding, van der Waals interactions, hydrophobic interactions, etc.). Without wishing to be bound by theory, it is believed that, when the zeta potential $Z_a$ is a numerical value that is the same sign as the overall charge of the polymer, and |zeta potential $Z_b$|>|zeta potential $Z_a$|, the polymer can encapsulate the abrasive particles and/or associate with the abrasive particles in some manner, such that the polymer provides both a steric barrier and an electrostatic barrier that prevents the abrasive particles from aggregating with one another. A steric barrier physically prevents particles from associating/aggregating, whereas an electrostatic barrier represents a repulsive force between two like-charged species (i.e., a negatively charged polymer and an abrasive particle having a negative zeta potential), thereby preventing the species from associating/aggregating. The prevention of abrasive particle aggregation is desirable, because the aggregates are necessarily larger than the component particles, which larger aggregates typically contribute to a higher substrate removal rate and concomitant undesirable increase in surface roughness when polishing substrates. In the situation where the substrate being polished also has similar characteristics to the abrasive particles (e.g., a glass substrate would be considered similar to silica abrasive particles in view of their similar chemical makeups), the polymer may also associate with the substrate, thereby providing both a steric barrier and an electrostatic barrier between the abrasive particles and the substrate surface, which barriers contribute to improve surface characteristics of the polished substrate. Thus, without wishing to be bound by theory, it is believed that when the polymer and abrasive particles have the characteristics and relationship described herein, the abrasive particles are prevented from aggregating and/or there is a lubricating effect provided by the polymer between the abrasive particles and the substrate surface, which effects can be attributed to steric and/or electrostatic interactions as described herein, such that a lower surface roughness of the substrate is achieved when chemical-mechanical polishing is performed with the chemical-mechanical polishing composition of the invention.

The abrasive particles can have any suitable zeta potential $Z_a$ and/or $Z_b$, provided that the relationship between the zeta potential of the abrasive particles and the charge of the polymer satisfy the characteristics set forth herein. The zeta potential values recited herein are applicable to both zeta potential $Z_a$ (the zeta potential measured in the absence of the polymer) and zeta potential $Z_b$ (the zeta potential measured in the presence of the polymer) as measured in the chemical-mechanical polishing composition of the invention. For example, the abrasive particles can have a positive zeta potential $Z_a$ and $Z_b$, or a negative zeta potential $Z_a$ and $Z_b$. The zeta potential of the abrasive particles typically can be adjusted by choice of the abrasive particle material, the pH of the polishing composition, and the identity and amount of the polymer. Typically, the zeta potential $Z_a$ and/or $Z_b$ of the abrasive particles is about −40 mV or more, e.g., about −30 mV or more, about −20 mV or more, about −15 mV or more, about −10 mV or more, about −9 mV or more, about −8 mV or more, about −7 mV or more, about −6.8 mV or more, about −6 mV or more, about −5 mV or more, about −4.8 mV or more, about −4.6 mV or more, about −4.4 mV or more, about −4.2 mV or more, about −4 mV or more, about −3.8 mV or more, about −3.6 mV or more, about −3.4 mV or more, about −3.2 mV or more, about −3 mV or more, about −2.8 mV or more, about −2.6 mV or more, about −2.4 mV or more, about −2.2 mV or more, about −2 mV or more, about −1.8 mV or more, about −1.6 mV or more, about −1.4 mV or more, about −1.2 mV or more, about −1 mV or more, about −0.8 mV or more, about −0.6 mV or more, about −0.4 mV or more, about −0.2 mV or more, about 0 mV or more, about +0.2 mV or more, about +0.4 mV or more, about +0.6 mV or more, about +0.8 mV or more, about +1 mV or more, about +1.2 mV or more, about +1.4 mV or more, about +1.6 mV or more, about +1.8 mV or more, about +2 mV or more, about +2.2 mV or more, about +2.4 mV or more, about +2.6 mV or more, about +2.8 mV or more, about +3 mV or more, about +3.2 mV or more, about +3.4 mV or more, about +3.6 mV or more, about +3.8 mV or more, about +4 mV or more, about +4.2 mV or more, about +4.4 mV or more, about +4.6 mV or more, about +4.8 mV or more, about +5 mV or more, about +6 mV or more, about +7 mV or more, about +8 mV or more, about +9 mV or more, about +10 mV or more, about +15 mV or more, about +20 mV or more, about +30 mV or more, or about +40 mV or more. Alternatively, or in addition, the zeta potential $Z_a$ and/or $Z_b$ of the abrasive particles can be about +100 mV or less, e.g., about +90 mV or less, about +85 mV or less, about +80 mV or less, about +70 mV or less, about +60 mV or less, about +50 mV or less, about +40 mV or less, about +30 mV or less, about +20 mV or less, about +15 mV or less, about +10 mV or less, about +9 mV or less, about +8 mV or less, about +7 mV or less, about +6 mV or less, about +5 mV or less, about +4.8 mV or less, about +4.6 mV or less, about +4.4 mV or less, about +4.2 mV or less, about +4 mV or less, about +3.8 mV or less, about +3.6 mV or less, about +3.4 mV or less, about +3.2 mV or less, about +3 mV or less, about +2.8 mV or less, about +2.6 mV or less, about +2.4 mV or less, about +2.2 mV or less, about +2 mV or less, about +1.8 mV or less, about +1.6 mV or less, about +1.4 mV or less, about +1.2 mV or less, about +1 mV or less, about +0.8 mV or less, about +0.6 mV or less, about +0.4 mV or less, about +0.2 mV or less, about 0 mV or less, about −0.2 mV or less, about −0.4 mV or less, about −0.6 mV or less, about −0.8 mV or less, about −1 mV or less, about −1.2 mV or less, about −1.4 mV or less, about −1.6 mV or less, about −1.8 mV or less, about −2 mV or less, about −2.2 mV or less, about −2.4 mV or less, about −2.6 mV or less, about −2.8 mV or less, about −3 mV or less, about −3.2 mV or less, about −3.4 mV or less, about −3.6 mV or less, about −3.8 mV or less, about −4 mV or less, about −4.2 mV or less, about −4.4 mV or less, about −4.6 mV or less, about −4.8 mV or less, about −5 mV or less, about −6 mV or less, about −7 mV or less, about −8 mV or less, about −9 mV or less, about −10 mV or less, about −15 mV or less, about −20 mV or less, about −30 mV or less, about −40 mV or less, about −50 mV or less, about −60 mV or less, about −70 mV or less, about −80 mV or less, about −90 mV or less, or about −100 mV or less. Thus, the zeta potential $Z_a$ and/or $Z_b$ of the abrasive particles can be within the range bounded by any two of the foregoing endpoints. For example, the zeta potential $Z_a$ and/or $Z_b$ can be about −40 mV to about +20 mV, about −15 mV to about 0 mV, or about −6.8 mV to about −0.8 mV. In a preferred embodiment, zeta potential $Z_a$ and zeta potential $Z_b$ are negative, and the zeta potential $Z_a$ and $Z_b$ are about −0.2 mV to about −6 mV.

Typically, the difference between the absolute value of the zeta potential $Z_b$ and the absolute value of the zeta potential $Z_a$ is greater than or equal to about 0.1 mV (i.e., |zeta potential $Z_b$|−|zeta potential $Z_a$|≥0.1 mV). This equation reflects, among other things, that the presence of the polymer typically increases the magnitude of the charge of the abrasive particles (i.e., the magnitude of zeta potential $Z_b$ is increased relative to the magnitude of zeta potential $Z_a$). For example, the value of |zeta potential $Z_b$|−|zeta potential $Z_a$| typically is ≥ about 0.1 mV, e.g., ≥ about 0.2 mV, ≥ about 0.3 mV, ≥ about 0.4 mV, ≥ about 0.5 mV, ≥ about 0.6 mV, ≥ about 0.7 mV, ≥ about 0.8 mV, ≥ about 0.9 mV, ≥ about 1 mV, ≥ about 1.1 mV, ≥ about 1.2 mV, ≥ about 1.3 mV, ≥ about 1.4 mV, ≥ about 1.5 mV, ≥ about 1.6 mV, ≥ about 1.7 mV, ≥ about 1.8 mV, ≥ about 1.9 mV, ≥ about 2 mV, ≥ about 2.1 mV, ≥ about 2.2 mV, ≥ about 2.3 mV, ≥ about 2.4 mV, ≥ about 2.5 mV, ≥ about 2.6 mV, ≥ about 2.7 mV, ≥ about 2.8 mV, ≥ about 2.9 mV, ≥ about 3 mV, ≥ about 3.1 mV, ≥ about 3.2 mV, ≥ about 3.3 mV, ≥ about 3.4 mV, ≥ about 3.5 mV, ≥ about 3.6 mV, ≥ about 3.7 mV, ≥ about 3.8 mV, ≥ about 3.9 mV, ≥ about 4 mV, ≥ about 4.1 mV, ≥ about 4.2 mV, ≥ about 4.3 mV, ≥ about 4.4 mV, ≥ about 4.5 mV, ≥ about 4.6 mV, ≥ about 4.7 mV, ≥ about 4.8 mV, ≥ about 4.9 mV, ≥ about 5 mV, ≥ about 6 mV, ≥ about 7 mV, ≥ about 8 mV, ≥ about 9 mV, or ≥ about 10 mV. Alternatively, or in addition, the value of |zeta potential $Z_b$|−|zeta potential $Z_a$| typically is ≤ about 10 mV, e.g., ≤ about 9 mV, ≤ about 8.2 mV, ≤ about 8 mV, ≤ about 7 mV, ≤ about 6.3 mV, ≤ about 6 mV, ≤ about 5 mV, ≤ about 4.9 mV, ≤ about 4.8 mV, ≤ about 4.7 mV, ≤ about 4.6 mV, ≤ about 4.5 mV, ≤ about 4.4 mV, ≤ about 4.3 mV, ≤ about 4.2 mV, ≤ about 4.1 mV, ≤ about 4 mV, ≤ about 3.9 mV, ≤ about 3.8 mV, ≤ about 3.7 mV, ≤ about 3.6 mV, ≤ about 3.5 mV, ≤ about 3.4 mV, ≤ about 3.3 mV, ≤ about 3.2 mV, ≤ about 3.1 mV, ≤ about 3 mV, ≤ about 2.9 mV, ≤ about 2.8 mV, ≤ about 2.7 mV, ≤ about 2.6 mV, ≤ about 2.5 mV, ≤ about 2.4 mV, ≤ about 2.3 mV, ≤ about 2.2 mV, ≤ about 2.1 mV, ≤ about 2 mV, ≤ about 1.9 mV, ≤ about 1.8 mV, ≤ about 1.7 mV, ≤ about 1.6 mV, ≤ about 1.5 mV, ≤ about 1.4 mV, ≤ about 1.3 mV, ≤ about 1.2 mV, ≤ about 1.1 mV, ≤ about 1 mV, ≤ about 0.9 mV, ≤ about 0.8 mV, ≤ about 0.7 mV, ≤ about 0.6 mV, ≤ about 0.5 mV, ≤ about 0.4 mV, ≤ about 0.3 mV, ≤ about 0.2 mV, or ≤ about 0.1 mV. Thus, the value of |zeta potential $Z_b$|−|zeta potential $Z_a$| can be within the range bounded by any two of the foregoing endpoints. For example, the value of |zeta potential $Z_b$|−|zeta potential $Z_a$| can be about 0.1 my to about 3.2 mV, about 1.2 my to about 6.3 mV, or about 5 mV to about 8.2 mV. In a preferred embodiment, the value of |zeta potential $Z_b$|−|zeta potential $Z_a$| is ≥ about 1 mV.

The polishing composition can have a pH of about 1 or more, or about 1.2 or more, or about 1.4 or more, about 1.6 or more, or about 1.8 or more. Alternatively, or in addition, the polishing composition can have a pH of about 6 or less, about 5.5 or less, about 5 or less, about 4.5 or less, or about 4 or less. Thus, the polishing composition can have a pH bounded by any two of the above endpoints recited for the polymer. For example the polishing composition can have a pH of about 1 to about 6, about 1.2 to about 5.5, about 1.4 to about 5, about 1.6 to about 4.5, or about 1.8 to about 4.

The pH of the polishing composition can be achieved and/or maintained by any suitable means. More specifically, the polishing composition can further comprise a pH adjustor, a pH buffering agent, or a combination thereof. The pH adjustor can be any suitable pH-adjusting compound. For example, the pH adjustor can be nitric acid, sodium hydroxide, potassium hydroxide, ammonium hydroxide, or a combination thereof. The pH buffering agent can be any suitable buffering agent, for example, phosphates, sulfates, acetates, borates, ammonium salts, and the like. The polishing composition can comprise any suitable amount of a pH adjustor and/or a pH buffering agent, provided that a suitable amount of the buffering agent is used to achieve and/or maintain the pH of the polishing composition within the ranges set forth herein.

The chemical-mechanical polishing composition of the invention may additionally comprise any suitable additional components depending on the type of workpiece, e.g., substrate, being polishing. For example, the chemical-mechanical polishing composition can additionally comprise oxidizing agents, corrosion inhibitors, anti-foaming agents, preservatives, biocides, and the like. Suitable oxidizing agents include perborates (e.g., sodium perborate, potassium perborate, ammonium perborate, etc.), percarbonates (e.g., sodium percarbonate, potassium percarbonate, etc.), perphosphates (e.g., sodium perphosphate, potassium perphosphate, etc.), chlorates and perchlorates (e.g., ammonium chlorate, tetramethylammonium chlorate, ammonium perchlorate, tetramethylammonium perchlorate, etc.), iodates and periodates (e.g., ammonium iodate, potassium iodate, ammonium periodate, tetramethylammonium periodate, etc.), persulfates (e.g., ammonium persulfate, tetramethylammonium persulfate, etc.), peroxides (e.g., compounds containing at least one peroxy group (—O—O—) including organic and inorganic peroxides, such as hydrogen peroxide, benzoyl peroxide, peracetic acid, di-tert-butyl peroxide, sodium peroxide, etc.), and combinations thereof. Suitable corrosion inhibitors include imidazole, tetrazole, aminotetrazole, benzotriazole, benzimidazole, urea and/or thiourea compounds containing amino, imino, carboxy, mercapto, nitro, and/or alkyl groups, dicarboxylic acids such as oxalic acid, malonic acid, succinic acid, nitrilotriacetic acid, iminodiacetic acid, and combinations thereof.

The polishing composition can be prepared by any suitable technique, many of which are known to those skilled in the art. The polishing composition can be prepared in a batch or continuous process. Generally, the polishing composition can be prepared by combining the components thereof in any order. The term "component" as used herein includes individual ingredients (e.g., abrasive particles, polymer, etc.) as well as any combination of ingredients (e.g., abrasive particles, polymer, optional biocide, etc.).

For example, the abrasive particles can be dispersed in water. The polymer then can be added, along with any optional additional compounds, and mixed by any method that is capable of incorporating the components into the polishing composition. The polymer can be added at any time during the preparation of the polishing composition. The polishing composition can be prepared prior to use, with one or more components, such as the polymer, added to the polishing composition just before use (e.g., within about 1 minute before use, or within about 1 hour before use, or within about 7 days before use). The polishing composition also can be prepared by mixing the components at the surface of the substrate during the polishing operation.

The polishing composition can be supplied as a one-package system comprising abrasive particles, polymer, and water. Alternatively, the abrasive particles can be supplied as a dispersion in water in a first container, and polymer and optional additional compounds can be supplied in a second container, either in dry form, or as a solution or dispersion in water. The components in the first or second container can be in dry form while the components in the other container can be in the form of an aqueous dispersion. Moreover, it is suitable for the components in the first and second containers to have different pH values, or alternatively to have substantially similar, or even equal, pH values. Other two-container, or three or more-container, combinations of the components of the polishing composition are within the knowledge of one of ordinary skill in the art.

The polishing composition of the invention also can be provided as a concentrate which is intended to be diluted with an appropriate amount of water prior to use. In such an embodiment, the polishing composition concentrate can comprise the abrasive particles, polymer, optional additional compounds, and water, in amounts such that, upon dilution of the concentrate with an appropriate amount of water, each component of the polishing composition will be present in the polishing composition in an amount within the appropriate range recited above for each component. For example, the abrasive particles, polymer, and optional additional compounds can each be present in the concentration in an amount that is about 2 times (e.g., about 3 times, about 4 times, or about 5 times) greater than the concentration recited above for each component so that, when the concentrate is diluted with an equal volume of (e.g., 2 equal volumes of water, 3 equal volumes of water, or 4 equal volumes of water, respectively), each component will be present in the polishing composition in an amount within the ranges set forth above for each component. Furthermore, as will be understood by those of ordinary skill in the art, the concentrate can contain an appropriate fraction of the water present in the final polishing composition in order to ensure that other components are at least partially or fully dissolved in the concentrate.

The invention also provides a method of chemically-mechanically polishing a substrate with the polishing composition described herein. The method comprises (1) contacting a substrate with a polishing pad and the chemical-mechanical polishing composition comprising, consisting essentially of, or consisting of (a) abrasive particles, (b) a polymer, and (c) water, wherein the following conditions are satisfied: (i) the polymer possesses an overall charge, (ii) the abrasive particles have a zeta potential $Z_a$ measured in the absence of the polymer and the abrasive particles have a zeta potential $Z_b$ measured in the presence of the polymer, wherein the zeta potential $Z_a$ is a numerical value that is the same sign as the overall charge of the polymer, and (iii) |zeta potential $Z_b$|>|zeta potential $Z_a$|, (2) moving the polishing pad relative to the substrate with the chemical-mechanical polishing composition therebetween, and (3) abrading at least a portion of the substrate to polish the substrate.

The substrate employed in the method can be any suitable substrate known in the art. For example, suitable substrates include memory storage devices, semiconductor substrates, and glass substrates. Suitable substrates for use in the method include memory disks, rigid disks, magnetic heads, MEMS devices, semiconductor wafers, field emission displays, and other microelectronic substrates, especially substrates comprising insulating layers (e.g., silicon dioxide, silicon nitride, or low dielectric materials) and/or metal-containing layers (e.g., copper, tantalum, tungsten, aluminum, nickel, titanium, platinum, ruthenium, rhodium, iridium, or other noble metals). Preferably the substrate comprises glass, and more preferably at least the upper-most layer (i.e., top layer) of the substrate to be polished comprises or consists of glass, such that glass is removed during the course of polishing the substrate with the inventive polishing composition so as to polish (e.g., smooth or planarize) the substrate.

The inventive method provides a polished substrate having a low average surface roughness. Surface roughness average ("$R_a$") is a common parameter well known in the art that is a measure of the surface contour, and therefore the roughness, of a substrate surface. $R_a$ represents the arithmetic average of the height of substrate surface peaks (e.g., roughness irregularities) above the mean plane of the substrate surface. $R_a$ typically is measured via an atomic force microscope (AFM) in conjunction with a computer program typically provided with the AFM instrument that analyzes the data collected by the AFM instrument. The surface roughness average ($R_a$) as used herein is measured by AFM, such that the surface roughness average parameter is termed "AFM-$R_a$" herein. AFM-$R_a$, as recited herein, is measured over a 0.5 μm×1 μm area of the substrate surface using the AFM instrument Nanoscope Dimension 3100 (i.e., D3100) commercially available from Veeco.

The AFM-$R_a$ of a substrate polished using the inventive method typically is about 2 Å or less, e.g., about 1.95 Å or less, about 1.9 Å or less, about 1.85 Å or less, about 1.8 Å or less, about 1.75 Å or less, about 1.7 Å or less, about 1.65 Å or less, about 1.6 Å or less, about 1.55 Å or less, about 1.5 Å or less, about 1.45 Å or less, about 1.4 Å or less, about 1.35 Å or less, about 1.3 Å or less, about 1.25 Å or less, about 1.2 Å or less, about 1.15 Å or less, about 1.1 Å or less, about 1.05 Å or less, about 1 Å or less, about 0.95 Å or less, about 0.9 Å or less, about 0.85 Å or less, about 0.8 Å or less, about 0.75 Å or less, about 0.7 Å or less, about 0.65 Å or less, about 0.6 Å or less, about 0.55 Å or less, about 0.5 Å or less, about 0.45 Å or less, about 0.4 Å or less, about 0.35 Å or less, about 0.3 Å or less, about 0.25 Å or less, about 0.2 Å or less, about 0.15 Å or less, about 0.1 Å or less, or about 0.05 Å or less. Alternatively, or in addition, the AFM-$R_a$ of a substrate polished using the inventive method typically is about 0.05 Å or more, e.g., about 0.1 Å or more, about 0.15 Å or more, about 0.2 Å or more, about 0.25 Å or more, about 0.3 Å or more, about 0.35 Å or more, about 0.4 Å or more, about 0.45 Å or more, about 0.5 Å or more, about 0.55 Å or more, about 0.6 Å or more, about 0.65 Å or more, about 0.7 Å or more, about 0.75 Å or more, about 0.8 Å or more, about 0.85 Å or more, about 0.9 Å or more, about 0.95 Å or more, about 1 Å or more, about 1.05 Å or more, about 1.1 Å or more, about 1.15 Å or more, about 1.2 Å or more, about 1.25 Å or more, about 1.3 Å or more, about 1.35 Å or more, about 1.4 Å or more, about 1.45 Å or more, about 1.5 Å or more, about 1.55 Å or more, about 1.6 Å or more, about 1.65 Å or more, about 1.7 Å or more, about 1.75 Å or more, about 1.8 Å or more, about 1.85 Å or more, about 1.9 Å or more, or about 1.95 Å or more. Thus, the AFM-$R_a$ of a substrate polished using the inventive method can be within the range bounded by any two of the foregoing endpoints. For example, the AFM-$R_a$ can be about 0.9 Å to about 1.25 Å, about 0.55 Å to about 0.8 Å, or about 0.75 Å to about 0.95 Å. In a preferred embodiment, the AFM-$R_a$ of a substrate polished using the inventive method is about 1 Å or less.

The inventive method provides a polished substrate having a low average asperity count. The average asperity count of a substrate, as defined herein, is the number of surface features (e.g., peaks or irregularities, i.e., "asperities") present on a 1×1 μm area of the polished substrate surface having a height or depth that is statistically larger in magnitude than the roughness average ($R_a$) of the substrate. The average asperity count is determined by the average of eight AFM measurements on a substrate surface (e.g., in the situation where both sides of the substrate are polished in the inventive method, four measurements are performed on the front surface of the substrate and four measurements are performed on the back surface of the substrate, wherein the four measurements on each side of the substrate are performed about half way between the center of the substrate and the edge of the substrate, and each location is separated by a rotation of 0°, 90°, 180°, and 270° about the center of the substrate). The AFM instrument used for the asperity count measurement is the Nanoscope Dimension 3100 commercially available from Veeco. "Statistically larger" means that the asperity has a height or depth that is about X % of the $R_a$ value of the substrate, wherein X % is about 110% or more, e.g., about 120% or more, about 130% or more, about 140% or more, about 150% or more, about 160% or more, about 170% or more, about 180% or more, about 190% or more, about 200% or more, about 210% or more, about 220% or more, about 230% or more, about 240% or more, about 250% or more, about 260% or more, about 270% or more, about 280% or more, about 290% or more, about 300% or more, about 320% or more, about 340% or more, about 360% or more, about 380% or more, about 400% or more, about 420% or more, about 440% or more, about 460% or more, about 480% or more, about 500% or more, about 520% or more, about 540% or more, about 560% or more, about 580% or more, about 600% or more, about 620% or more, about 640% or more, about 660% or more, about 680% or more, about 700% or more, about 720% or more, about 740% or more, about 760% or more, about 780% or more, about 800% or more, about 820% or more, about 840% or more, about 860% or more, about 880% or more, about 900% or more, about 920% or more, about 940% or more, about 960% or more, about 980% or more, or about 1000% or more.

The average asperity count of a substrate polished using the inventive method (e.g., employing a chemical-mechanical polishing composition as defined herein) typically is about 1.5 or less, e.g., about 1.4 or less, about 1.3 or less, about 1.2 or less, about 1.1 or less, about 1 or less, about 0.9 or less, about 0.8 or less, about 0.75 or less, about 0.7 or less, about 0.65 or less, about 0.6 or less, about 0.55 or less, about 0.5 or less, about 0.45 or less, about 0.4 or less, about 0.35 or less, about 0.3 or less, about 0.25 or less, about 0.2 or less, about 0.15 or less, about 0.1 or less, about 0.05 or less, or about 0. Preferably, the average asperity count of a substrate polished using the inventive method is about 1 or less. In contrast, the average asperity count of a substrate polished using a conventional chemical-mechanical polishing composition (e.g., a composition that is otherwise identical but does not comprise, for example, the polymer as defined herein) typically is about 1.75 or more.

The magnitude of asperities of a substrate polished using the inventive method (e.g., employing a chemical-mechanical polishing composition as defined herein) typically is lower than the magnitude of asperities of a substrate polished using a conventional chemical-mechanical polishing composition (e.g., a composition that is otherwise identical but does not comprise, e.g., the polymer as defined herein and/or does not possess the relationship between polymer charge and zeta potential described herein). For example, the magnitude of asperities of a substrate polished using the inventive method, as compared to the magnitude of asperities of a substrate polished using an otherwise identical polishing composition that does not contain the polymer (and/or does not possess the relationship between polymer charge and zeta potential described herein), is about 90% or less, e.g., about 80% or less, about 70% or less, about 60% or less, about 50% or less, about 40% or less, about 30% or less, about 20% or less, or about 10% or less.

The polishing method of the invention is particularly suited for use in conjunction with a chemical-mechanical polishing (CMP) apparatus. Typically, the apparatus comprises a platen, which, when in use, is in motion and has a velocity that results from orbital, linear, or circular motion, a polishing pad in contact with the platen and moving with the platen when in motion, and a carrier that holds a substrate to be polished by contacting and moving relative to the surface of the polishing pad. The polishing of the substrate takes place by the substrate being placed in contact with the polishing pad and the polishing composition of the invention and then the polishing pad moving relative to the substrate, so as to abrade at least a portion of the substrate to polish the substrate.

A substrate can be planarized or polished with the chemical-mechanical polishing composition with any suitable polishing pad (e.g., polishing surface). Suitable polishing pads include, for example, woven and non-woven polishing pads. Moreover, suitable polishing pads can comprise any suitable polymer of varying density, hardness, thickness, compressibility, ability to rebound upon compression, and compression modulus. Suitable polymers include, for example, polyvinylchloride, polyvinylfluoride, nylon, fluorocarbon, polycarbonate, polyester, polyacrylate, polyether, polyethylene, polyamide, polyurethane, polystyrene, polypropylene, coformed products thereof, and mixtures thereof.

Desirably, the CMP apparatus further comprises an in situ polishing endpoint detection system, many of which are known in the art. Techniques for inspecting and monitoring the polishing process by analyzing light or other radiation reflected from a surface of the workpiece are known in the art. Such methods are described, for example, in U.S. Pat. No. 5,196,353, U.S. Pat. No. 5,433,651, U.S. Pat. No. 5,609,511, U.S. Pat. No. 5,643,046, U.S. Pat. No. 5,658,183, U.S. Pat. No. 5,730,642, U.S. Pat. No. 5,838,447, U.S. Pat. No. 5,872,633, U.S. Pat. No. 5,893,796, U.S. Pat. No. 5,949,927, and U.S. Pat. No. 5,964,643. Desirably, the inspection or monitoring of the progress of the polishing process with respect to a workpiece being polished enables the determination of the polishing end-point, i.e., the determination of when to terminate the polishing process with respect to a particular workpiece.

A chemical-mechanical polishing process can be characterized in a number of ways, such as in terms of the removal rate of a substrate, the resulting surface roughness, and the resulting edge roll-off of a substrate.

The removal rate of a substrate can be determined using any suitable technique. Examples of suitable techniques for determining the removal rate of a substrate include weighing the substrate before and after use of the inventive polishing method to determine the amount of substrate removed per unit of polishing time, which can be correlated with the removal rate in terms of thickness of substrate removed per unit of polishing time, and determining the thickness of the substrate before and after use of the inventive polishing method to directly measure the removal rate of the substrate per unit of polishing time.

Measurement of surface roughness is well known in the art. Suitable techniques for the determination of surface roughness of a substrate include surface profilometry, light scattering techniques, interferometry, and atomic force microscopy ("AFM"). Instrumentation useful in determining surface roughness is commercially available from vendors including Schmitt Industries (Portland, Oreg.), Lightmachinery, Inc. (CA), and Veeco Instruments (Plainfield, N.Y.).

After chemical-mechanical polishing of the substrate, the polished substrate typically has an atomic force microscopy roughness average (AFM-$R_a$) of about 95% or less than a substrate that has been polished with an otherwise identical polishing composition that does not comprise the polymer (and/or does not possess the relationship between polymer charge and zeta potential described herein). For example, the AFM-$R_a$ is about 95% or less, e.g., about 90% or less, about 85% or less, about 80% or less, about 75% or less, about 70% or less, about 65% or less, about 60% or less, about 55% or less, about 50% or less, about 45% or less, about 40% or less, about 35% or less, about 30% or less, about 25% or less, about 20% or less, about 15% or less, about 10% or less, or about 5% or less of an AFM-$R_a$ when employing an otherwise identical polishing composition that does not contain the polymer (and/or does not possess the relationship between polymer charge and zeta potential described herein). Alternatively, or in addition, the AFM-$R_a$ can be about 5% or more, e.g., about 10% or more, about 15% or more, about 20% or more, about 25% or more, about 30% or more, about 35% or more, about 40% or more, about 45% or more, about 50% or more, about 55% or more, about 60% or more, about 65% or more, about 70% or more, about 75% or more, about 80% or more, about 85% or more, about 90% or more, or about 95% or more of an AFM-$R_a$ when employing an otherwise identical polishing composition that does not contain the polymer (and/or does not possess the relationship between polymer charge and zeta potential described herein). Thus, the comparative AFM-$R_a$ can be within the range bounded by any two of the foregoing endpoints. For example, the AFM-$R_a$ can be about 60% to about 75%, about 50% to about 70%, or about 25% to about 90% of a removal rate of an otherwise identical polishing composition that does not comprise the polymer (and/or does not possess the relationship between polymer charge and zeta potential described herein).

The following examples further illustrate the invention but, of course, should not be construed as in any way limiting its scope.

The polishing experiments recited in the Examples were conducted using the following polishing parameters:

| Parameter | Value |
| --- | --- |
| Polishing tool | HAMAI 9B |
| Polishing pad | Filwel SPL2 (X-Y groove) |
| Polishing composition flow rate | 2000 mL/min |
| Down force | 100 g/cm$^2$ |
| Radius of polishing table | 0.3 m |
| Lower platen speed | 60 rpm |
| Buff carrier rotation rpm | 20 |
| Buff carrier revolution rpm | 12 |

AFM-$R_a$ is the surface roughness average measured by atomic force microscopy (AFM) according to the procedure described herein. AFM-$R_q$ is the root mean square average of the height of peaks (e.g., roughness irregularities) on the surface of a substrate above the mean plane of the substrate surface. AFM-$R_q$ was determined according to procedures similar to AFM-$R_a$ described herein, except that the resulting data was subject to root mean square averaging (AFM-$R_q$), as opposed to arithmetic averaging (AFM-$R_a$). The surface roughness was measured by use of an D3100 atomic force microscope (Veeco, Plainfield, N.Y.). The "AFM Ra (Å) 2×1 μm" referred to herein is the surface roughness measured for a 0.5×1 μm scan area.

EXAMPLE 1

This example demonstrates the effect of sodium polyacrylate on the removal rate and surface roughness achievable by the inventive polishing compositions in the polishing of separate substrates comprising glass disks.

Four separate substrates comprising glass disks were polished with three different polishing compositions. Each of the polishing compositions comprised 8 wt. % of colloidal silica having a D50 particle size of 34 nm in water at a pH of 2.3. Polishing Composition 1A (control) did not comprise any polymer. Polishing Composition 1B (invention) further comprised 50 ppm of sodium polyacrylate. Polishing Composition 1C (comparative) further comprised 50 ppm of polyacrylamide. Two substrates were polished with Polishing Composition 1A, while Polishing Compositions 1B and 1C were used to polish a single substrate.

Following polishing, the removal rate and the surface roughness of each of the substrates was determined. The results are set forth in Table 1.

TABLE 1

| Polishing Composition | Polymer | Polymer Concentration | Silica Zeta Potential | Removal Rate (μm/min) | AFM Ra (Å) |
| --- | --- | --- | --- | --- | --- |
| 1A (control) | none | 0 ppm | −3.22 mV | 0.230 | 1.23 |
|  |  |  | −3.15 mV | 0.221 | 1.17 |
| 1B (invention) | sodium polyacrylate | 50 ppm | −4.66 mV | 0.196 | 1.04 |
| 1C (comparative) | polyacrylamide | 50 ppm | −3.21 mV | 0.177 | 1.16 |

As is apparent from the results set forth in Table 1, the inventive polishing composition comprising sodium polyacrylate exhibited a removal rate that was approximately 86% of the average of the removal rates exhibited by the control polishing composition, and an AFM surface roughness (Ra) that was approximately 87% of the average AFM surface roughness exhibited by the control polishing composition. The comparative polishing composition exhibited a removal rate that was approximately 78% of the average of the removal rates exhibited by the control polishing composition, and an AFM surface roughness (Ra) that was approximately 97% of the AFM surface roughness exhibited by the control polishing composition. In addition, the silica particles in Polishing Composition 1B exhibited a more negative zeta potential than the silica particles in Polishing Compositions 1A and 1C.

EXAMPLE 2

This example demonstrates the effect of pH on the removal rate and surface roughness in the polishing of separate substrates comprising glass disks.

Six separate substrates comprising glass disks were polished with five different polishing compositions. Each of the polishing compositions contained 8.5 wt. % of colloidal silica having a D50 particle size of 30 nm in water. Polishing Compositions 2A-2E had a pH of 2.3, 2.6, 2.8, 3, and 4, respectively. Two substrates were polished with Polishing Composition 2A, while each of Polishing Compositions 2B-2E was used to polish a single substrate.

Following polishing, the removal rate and the surface roughness of each of the substrates was determined. The results are set forth in Table 2.

TABLE 2

| Polishing Composition | pH | Removal Rate (µm/min) | AFM Ra (Å) 2 × 1 µm |
|---|---|---|---|
| 2A | 2.3 | 0.118 | 1.22 |
|    |     | 0.109 | 1.21 |
| 2B | 2.6 | 0.093 | 1.20 |
| 2C | 2.8 | 0.082 | 1.16 |
| 2D | 3   | 0.042 | 1.14 |
| 2E | 4   | 0.033 | 1.03 |

As is apparent from the results set forth in Table 2, the lowest AFM surface roughness was exhibited by Polishing Composition 2E, having a pH of 4, which surface roughness was approximately 85% of the average surface roughness exhibited by Polishing Composition 2A, which had a pH of 2.3. However, the removal rate exhibited by Polishing Composition 2E was approximately 29% of the average removal rate exhibited by Polishing Composition 2A.

EXAMPLE 3

This example demonstrates the effect of silica particle size and amount of polymer on removal rate and surface roughness in the polishing of separate substrates comprising glass disks.

Nine separate substrates comprising glass disks were polished with eight different polishing compositions. Each of the polishing compositions comprised 8 wt. % of colloidal silica in water at a pH of 2.3. Polishing Composition 3A (comparative) contained colloidal silica having a D50 particle size of 34 nm and did not comprise any polymer. Polishing Composition 3B (invention) contained colloidal silica having a D50 particle size of 34 nm and further comprised 50 ppm of polyacrylic acid. Polishing Composition 3C (invention) contained colloidal silica having a D50 particle size of 34 nm and further comprised 500 ppm of polyacrylic acid. Polishing Composition 3D (comparative) contained colloidal silica having a D50 particle size of 26 nm and did not comprise any polymer. Polishing Composition 3E (invention) contained colloidal silica having a D50 particle size of 26 nm and further comprised 500 ppm of polyacrylic acid. Polishing Composition 3F (comparative) contained colloidal silica having a D50 particle size of 18 nm and did not comprise any polymer. Polishing Composition 3G (invention) contained colloidal silica having a D50 particle size of 18 nm and further comprised 50 ppm of polyacrylic acid. Polishing Composition 3H (invention) contained colloidal silica having a D50 particle size of 18 nm and further comprised 500 ppm of polyacrylic acid. Two substrates were polished with Polishing Composition 3A, while each of Polishing Compositions 3B-3H was used to polish a single substrate.

Following polishing, the removal rate and the surface roughness of each of the substrates was determined. The results are set forth in Table 3.

TABLE 3

| Polishing Composition | D50 Particle Size | Polyacrylic Acid | Removal Rate (µm/min) | AFM Ra (Å) 2 × 1 µm |
|---|---|---|---|---|
| 3A (comparative) | 34 nm | 0 ppm | 0.216 | 1.21 |
|                  |       |       | 0.191 | 1.19 |
| 3B (invention)   | 34 nm | 50 ppm | 0.196 | 1.07 |
| 3C (invention)   | 34 nm | 500 ppm | 0.100 | 0.89 |
| 3D (comparative) | 26 nm | 0 ppm | 0.103 | 1.03 |
| 3E (invention)   | 26 nm | 500 ppm | 0.097 | 0.92 |
| 3F (comparative) | 18 nm | 0 ppm | 0.030 | 0.94 |
| 3G (invention)   | 18 nm | 50 ppm | 0.038 | 0.90 |
| 3H (invention)   | 18 nm | 500 ppm | 0.040 | 0.89 |

As is apparent from the results set forth in Table 3, with silica having a D50 particle size of 34 nm, increasing the amount of polyacrylic acid from 0 ppm in Polishing Composition 3A to 50 ppm in Polishing Composition 3B resulted in a decrease in AFM Ra of approximately 13% and a reduction in removal rate of approximately 4%. Increasing the amount of polyacrylic acid from 0 ppm in Polishing Composition 3A to 500 ppm in Polishing Composition 3C resulted in a decrease in AFM Ra of approximately 26% and a reduction in removal rate of approximately 51%. Decreasing the silica D50 particle size to 26 nm as in Polishing Compositions 3D and 3E or to 18 nm as in Polishing Compositions 3F-3H, with or without added polyacrylic acid, resulted in approximately 50-85% reduction in removal rates as compared to Polishing Composition 3A, which contained silica having a D50 particle size of 34 nm.

EXAMPLE 4

This example demonstrates the effect of the type of silica present in a polishing composition on removal rate and surface roughness in the polishing of separate substrates comprising glass disks.

Five separate substrates comprising glass disks were polished with four different polishing compositions. Each of the polishing compositions comprised 8.5 wt. % of silica in water and 50 ppm of polyacrylic acid at a pH of 2.3. Polishing Composition 4A (invention) contained colloidal silica derived from sodium silicate and having a D50 particle size of 34 nm. Polishing Composition 4B (invention) contained substantially spherical silica derived from tetraethylorthosilicate ("TEOS") and having a D50 particle size of 25 nm. Polishing Composition 4C (comparative) contained cocoon-shaped silica derived from TEOS and having a D50 particle size of 50 nm. Polishing Composition 4D (comparative) contained aggregated silica derived from TEOS and having a D50 particle size of 72 nm. Two substrates were polished with Polishing Composition 4A, while each of Polishing Compositions 4B-4D was used to polish a single substrate.

Following polishing, the removal rate and the surface roughness of the substrates were determined. The results are set forth in Table 4.

TABLE 4

| Polishing Composition | Silica Type | D50 Particle Size | Removal Rate (µm/min) | AFM Ra (Å) 2 × 1 µm |
|---|---|---|---|---|
| 4A (invention) | sodium silicate | 34 | 0.221 | 1.09 |
|                |                 |    | 0.187 | 1.05 |
| 4B (invention) | TEOS | 25 | 0.191 | 1.16 |
| 4C (comparative) | TEOS | 50 | 0.274 | 1.61 |
| 4D (comparative) | TEOS | 72 | 0.465 | 1.78 |

As is apparent from the results set forth in Table 4, Polishing Composition 4B, which contained TEOS-derived silica having a D50 particle size of 25 nm, exhibited a AFM surface roughness that was approximately 8.4% greater, and a removal rate that was approximately 6.4% lower than, the average AFM surface roughness and average removal rate exhibited by Polishing Composition 4A. Polishing Composition 4C, which contained TEOS-derived silica having a D50 particle size of 50 nm, exhibited a AFM surface roughness that was approximately 50% greater, and a removal rate that was approximately 34% greater than, the average AFM surface roughness and average removal rate exhibited by Polishing Composition 4A. Polishing Composition 4D, which contained TEOS-derived silica having a D50 particle size of 72 nm, exhibited a AFM surface roughness that was approximately 66% greater, and a removal rate that was approximately 128% greater than, the average AFM surface roughness and average removal rate exhibited by Polishing Composition 4A.

EXAMPLE 5

This example demonstrates the effect of polyacrylic acid present in a polishing composition on the asperity count in the polishing of separate substrates comprising glass disks.

Two separate substrates comprising glass disks were polished with two different polishing compositions. Each of the polishing compositions comprised 8.5 wt. % of a sodium silicate-derived colloidal silica in water at a pH of 2.3 Polishing Composition 5A (comparative) did not contain any polymer. Polishing Composition 5B (invention) further contained 50 ppm of polyacrylic acid.

Figure 1B:
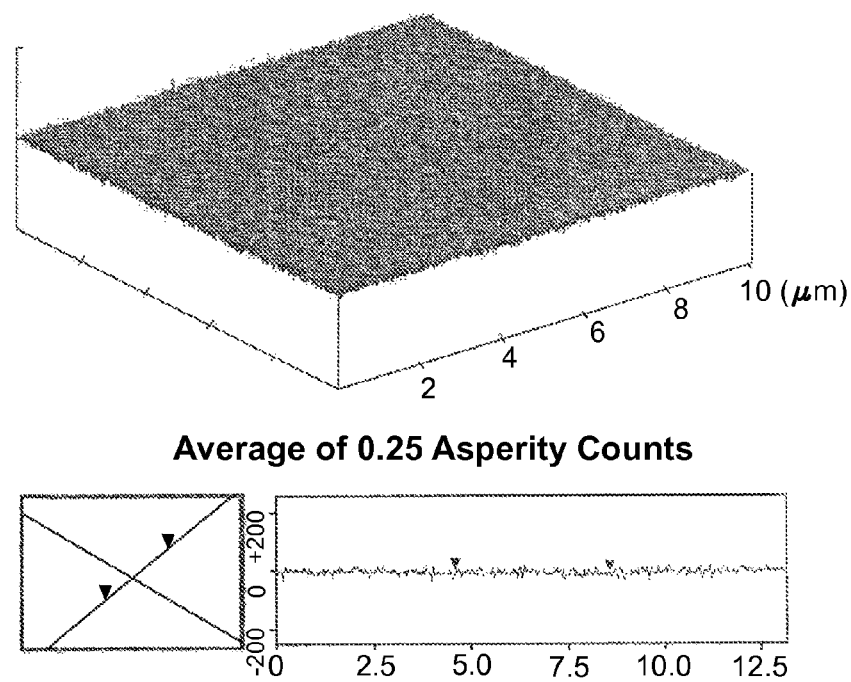

Following polishing, the substrates were inspected using a Nanoscope Dimension 3100 atomic force microscope (Bruker, Santa Barbara, Calif.). Four 1×1 μm sites on each disk were inspected. The disk polished with Polishing Composition 5A exhibited approximately 2 asperities per measurement site, while the disk polished with Polishing Composition 5B exhibited approximately 0.25 asperities per measurement site. The results are illustrated in FIGS. 1A and 1B.

EXAMPLE 6

This example demonstrates the effect of the amount of a polymer, for different abrasive particle sizes, on the removal rate and AFM-$R_a$ observed when polishing glass substrates with chemical-mechanical polishing compositions comprising the polymer, wherein the polymer employed has an overall charge that is the same sign as the zeta potential $Z_a$ of the abrasive particles.

Polishing Compositions 3A-3C from Example 3, and the AFM-$R_a$ and removal rates therefor, are reproduced in Table 5 for convenience and ease of comparison with the polishing compositions of this example. Nineteen similar substrates comprising circular glass disks were each polished with one of nineteen polishing compositions (Polishing Compositions 6A-6S). Each of the polishing compositions contained either 8 wt. % (Polishing Compositions 3A-3C and 6A-6E) or 8.5 wt. % (Polishing Compositions 6F-6S) of wet-process substantially spherical silica abrasive particles prepared from sodium silicate. Any differences in removal rate or AFM-$R_a$ arising from the difference in amount of silica particles (8 wt. % vs. 8.5 wt. %) is expected to be minimal compared to the effect of the polymer, such that, in the context of this example, the difference in amount of silica is not considered to be significant. Polishing Compositions 3A-3C and 6A-6O had a pH of 2.3 and demonstrate the effect of polymer amount on abrasive particles having different median particle sizes. Polishing Compositions 6P-6S had a pH of either 4 or 8 and employ only one size particle (about 34 nm) to demonstrate the effects of employing the polymer at these pHs. The silica abrasive particles had, at the pH of the polishing compositions, the median particle sizes indicated in Table 5. The polishing compositions contained polyacrylate (e.g., DEQUEST P9020 available from Thermphos), i.e., an anionic polymer, in the amount indicated in Table 5. The polyacrylate had a weight-average molecular weight of about 3000 g/mol.

Following polishing, the removal rate and AFM-$R_a$ were determined for each of the polishing compositions. The results are summarized in Table 5.

TABLE 5

| Polishing Composition | pH | Polymer Amount (ppm) | Silica Median Particle Size (nm) | Removal Rate (Å/min) | AFM-$R_a$ (Å) |
|---|---|---|---|---|---|
| 6A | 2.3 | 0 | 18 | 300 | 0.94 |
| 6B | 2.3 | 50 | 18 | 380 | 0.90 |
| 6C | 2.3 | 500 | 18 | 400 | 0.89 |
| 6D | 2.3 | 0 | 26 | 1030 | 1.03 |
| 6E | 2.3 | 500 | 26 | 970 | 0.92 |
| 3A | 2.3 | 0 | 34 | 2160 | 1.21 |
| 6F | 2.3 | 0 | 34 | 2330 | 1.17 |
| 3B | 2.3 | 50 | 34 | 1960 | 1.07 |
| 6G | 2.3 | 50 | 34 | 2120 | 1.08 |
| 6H | 2.3 | 50 | 34 | 1810 | 1.06 |
| 3C | 2.3 | 500 | 34 | 1000 | 0.89 |
| 6I | 2.3 | 500 | 34 | 1460 | 0.9 |
| 6J | 2.3 | 0 | 66 | 4320 | 2.02 |
| 6K | 2.3 | 50 | 66 | 3520 | 1.73 |
| 6L | 2.3 | 500 | 66 | 1980 | 1.44 |
| 6M | 2.3 | 0 | 96 | 5950 | 2.21 |
| 6N | 2.3 | 50 | 96 | 5920 | 2.04 |
| 6O | 2.3 | 500 | 96 | 5900 | 1.96 |
| 6P | 4 | 0 | 34 | 1060 | 0.89 |
| 6Q | 4 | 500 | 34 | 636 | 0.87 |
| 6R | 8 | 0 | 34 | 1220 | 0.88 |
| 6S | 8 | 500 | 34 | 930 | 0.86 |

As is apparent from Table 5, a comparison of the effect of the inclusion of polyacrylate in the polishing compositions across different median particle sizes (at a pH of 2.3) reveals that the reduction in AFM-$R_a$ (about 24% and 29%) achieved by employing polyacrylate in amounts from 0 ppm to 500 ppm is more pronounced for polishing compositions comprising abrasive particles having a median particle size of about 34 nm and 66 nm, respectively, as compared to the AFM-$R_a$ reduction (about 5%, 11%, and 11%) observed for abrasive particles having other median particle sizes (e.g., 18 nm, 26 nm, and 96 nm, respectively) (where applicable, the polishing results for a polishing composition having the same amount of polymer and same median particle size were averaged to obtain the reduction rates reported herein). Moreover, the inclusion of polyacrylate in polishing compositions having a pH of 4 or 8 was found to decrease the removal rate, while also somewhat improving the AFM-$R_a$. It is clear from the results set forth in Table 5 that polyacrylate has a favorable effect on the AFM-$R_a$ at all of the median particle sizes and pHs depicted in Table 5.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A chemical-mechanical polishing composition comprising:
   (a) abrasive particles,
   (b) a polymer, wherein the polymer comprises monomers that are an (alkyl)acrylic acid, a salt thereof, or a combination thereof and 0-3 mol % of a comonomer having a sulfonate group or sulfonic acid group, and wherein the polymer has a weight-average molecular weight of about 1000 to about 4000 g/mol, and
   (c) water,
   wherein the following conditions are satisfied:
   (i) the polymer possesses an overall charge,
   (ii) the abrasive particles have a zeta potential Za measured in the absence of the polymer and the abrasive particles have a zeta potential Zb measured in the presence of the polymer, wherein the zeta potential Za is a numerical value that is the same sign as the overall charge of the polymer, and
   (iii) |zeta potential Zb|>|zeta potential Za|.

2. The polishing composition of claim 1, wherein the outer surface of the abrasive particles consists of silica.

3. The polishing composition of claim 1, wherein the abrasive particles are synthesized by condensing an alkali metal silicate.

4. The polishing composition of claim 1, wherein the abrasive particles have a spherical shape.

5. The polishing composition of claim 1, wherein the abrasive particles are present in an amount of about 1 wt. % to about 30 wt. %.

6. The polishing composition of claim 1, wherein the abrasive particles have an average particle size of about 1 nm to about 100 nm.

7. The polishing composition of claim 1, wherein the polymer is present in an amount of about 1 ppm to about 10,000 ppm.

8. The polishing composition of claim 1, wherein the polishing composition has a pH of about 1 to about 6.

9. A chemical-mechanical polishing composition comprising:
   (a) abrasive particles comprising silica on an outer surface of the abrasive particles,
   (b) a polymer comprising a poly(alkyl)acrylate, a salt thereof, or a combination thereof, wherein the polymer comprises 0-3 mol % of a monomer having a sulfonate group or sulfonic acid group, and
   (c) water,
   wherein the polishing composition has a pH of about 1.8 to about 4 and the following conditions are satisfied:
   (i) the polymer possesses an overall negative charge,
   (ii) the abrasive particles have a zeta potential Za measured in the absence of the polymer and the abrasive particles have a zeta potential Zb measured in the presence of the polymer, wherein the zeta potential Za is negative, and
   (iii) |zeta potential Zb|>|zeta potential Za|.

10. The polishing composition of claim 9, wherein the abrasive particles are synthesized by condensing an alkali metal silicate.

11. The polishing composition of claim 9, wherein the abrasive particles are spherical in shape.

12. The polishing composition of claim 9, wherein the abrasive particles are present in an amount of about 1 wt. % to about 30 wt. %.

13. The polishing composition of claim 9, wherein the abrasive particles have an average particle size of about 1 nm to about 50 nm.

14. The polishing composition of claim 9, wherein the polymer is a homopolymer of an (alkyl)acrylic acid, a salt thereof, or a combination thereof.

15. The polishing composition of claim 9, wherein the polymer has a weight-average molecular weight of about 1000 to about 4000 g/mol.

16. The polishing composition of claim 14, wherein the polymer is present in an amount of about 1 ppm to about 2,000 ppm.

17. The polishing composition of claim 9, wherein the following equation is satisfied: |zeta potential Zb|−|zeta potential Za|≥1 mV.

18. A method of chemical-mechanically polishing a substrate, which method comprises:
   (1) contacting a substrate with a polishing pad and the chemical-mechanical polishing composition comprising:
   (a) abrasive particles,
   (b) a polymer, wherein the polymer comprises monomers that are an (alkyl)acrylic acid, a salt thereof, or a combination thereof and 0-3 mol % of a comonomer having a sulfonate group or sulfonic acid group, and wherein the polymer has a weight-average molecular weight of about 1000 to about 4000 g/mol, and
   (c) water,
   wherein the following conditions are satisfied:
   (i) the polymer possesses an overall charge, (ii) the abrasive particles have a zeta potential Za measured in the absence of the polymer and the abrasive particles have a zeta potential Zb measured in the presence of the polymer, wherein the zeta potential Za is a numerical value that is the same sign as the overall charge of the polymer, and (iii) |zeta potential Zb|>|zeta potential Za|, (2) moving the polishing pad relative to the substrate with the chemical-mechanical polishing composition therebetween, and (3) abrading at least a portion of the substrate to polish the substrate.

19. The method of claim 18, wherein the substrate has a zeta potential Zc measured in the absence of the polymer, wherein the zeta potential Zc has a numerical value that is the same sign as (a) the numerical value of zeta potential Za and (b) the overall charge of the polymer.

20. The method of claim 18, wherein the substrate is glass.

21. The method of claim 18, wherein the polymer comprises a poly(alkyl)acrylate, a salt thereof, or a combination thereof.

22. The method of claim 18, wherein, after chemical-mechanical polishing of the substrate, the polished substrate has an atomic force microscopy roughness average (AFM Ra) of about 1.5 Å or less, as measured over a 2 μm×1 μm area of the polished substrate.

* * * * *